United States Patent
Hansen

(10) Patent No.: US 10,450,130 B2
(45) Date of Patent: *Oct. 22, 2019

(54) CARTRIDGES, SYSTEMS AND METHODS FOR PREPARATION OF BEVERAGES

(75) Inventor: Nick Andrew Hansen, Banbury (GB)

(73) Assignee: Kraft Foods R & D, Inc., Deerfield, IL (US)

( * ) Notice: Subject to any disclaimer, the term of this patent is extended or adjusted under 35 U.S.C. 154(b) by 1023 days.

This patent is subject to a terminal disclaimer.

(21) Appl. No.: 13/612,487

(22) Filed: Sep. 12, 2012

(65) Prior Publication Data

US 2014/0072677 A1     Mar. 13, 2014

(51) Int. Cl.
*B65D 85/804*   (2006.01)
*A47J 31/06*    (2006.01)
*A47J 31/36*    (2006.01)

(52) U.S. Cl.
CPC ...... *B65D 85/8043* (2013.01); *A47J 31/0673* (2013.01); *A47J 31/3695* (2013.01)

(58) Field of Classification Search
CPC .. B65D 85/808; B65D 85/8043; B65D 81/32; B65D 85/804; B65D 85/8046;
(Continued)

(56) References Cited

U.S. PATENT DOCUMENTS 2,778,739 A * 1/1957 Rodth .............................. 426/77
3,812,273 A   5/1974 Schmidt
(Continued)

FOREIGN PATENT DOCUMENTS

CA    2872667 A1   11/2013
CN    201260912    6/2009
(Continued)

OTHER PUBLICATIONS

"Depend." Merriam-Webster Dictionary. Feb. 20, 2010. <https:www.merriam-webster.com/dictionary/depend/>. Accessed Feb. 15, 2018. (Year: 2010).*
(Continued)

*Primary Examiner* — Nikki H. Dees
*Assistant Examiner* — Ericson M Lachica
(74) *Attorney, Agent, or Firm* — Fitch, Even, Tabin & Flannery LLP

(57) ABSTRACT

A cartridge for preparation of a beverage comprising: a closed container defining a container volume; a filter to divide the container volume into an ingredient chamber volume and a filtrate volume; a beverage medium located in the ingredient chamber volume; and a guard element located in the filtrate volume; wherein the guard element is separately-formed from the closed container and located within the filtrate volume to define an outlet zone, the guard element being interposed between the filter and the outlet zone; wherein the guard element is configured to prevent encroachment of the filter into the outlet zone such that on piercing of a piercing surface of the cartridge by a piercing element of a beverage preparation apparatus the piercing element is enabled to be placed in fluid communication with the outlet zone without the piercing element contacting the guard element or filter. Associated methods and systems are also disclosed.

16 Claims, 6 Drawing Sheets

(58) Field of Classification Search
CPC .... A47J 31/0673; A47J 31/3695; A47J 31/00; A23G 1/56; A23F 3/18; A23F 5/26
USPC ............ 426/77, 431, 433, 115; 99/295, 323
See application file for complete search history.

(56) References Cited

U.S. PATENT DOCUMENTS

| | | | |
|---|---|---|---|
| 4,995,310 | A | 2/1991 | van der Lijn |
| 5,298,267 | A | 3/1994 | Gruenbacher |
| 5,325,765 | A | 7/1994 | Sylvan |
| 5,840,189 | A | 11/1998 | Sylvan |
| 6,182,554 | B1 | 2/2001 | Beaulieu |
| 6,189,438 | B1 | 2/2001 | Bielfeldt |
| 6,440,256 | B1 | 8/2002 | Gordon |
| 6,740,345 | B2 | 5/2004 | Cai |
| 8,186,264 | B2 | 5/2012 | Rijskamp |
| 8,425,964 | B2 | 4/2013 | Doglioni Majer |
| 8,443,717 | B2 | 5/2013 | Venturi |
| 2002/0185010 | A1 | 12/2002 | Spiteri |
| 2003/0172813 | A1 | 9/2003 | Schifferle |
| 2004/0163543 | A1 | 8/2004 | Hu |
| 2005/0051478 | A1* | 3/2005 | Karanikos .......... B65D 85/8043 210/469 |
| 2005/0217213 | A1 | 10/2005 | Lozinski |
| 2006/0236871 | A1 | 10/2006 | Ternite et al. |
| 2010/0028495 | A1 | 2/2010 | Novak |
| 2010/0239733 | A1 | 9/2010 | Yoakim |
| 2010/0288131 | A1 | 11/2010 | Kilber |
| 2010/0303964 | A1* | 12/2010 | Beaulieu ............ B65D 85/8043 426/77 |
| 2011/0064852 | A1* | 3/2011 | Mann ................. B65D 85/8043 426/78 |
| 2011/0076361 | A1 | 3/2011 | Peterson |
| 2011/0097450 | A1 | 4/2011 | Kruger |
| 2012/0118166 | A1 | 5/2012 | Macchi |
| 2013/0059039 | A1 | 3/2013 | Trombetta |
| 2013/0101716 | A1 | 4/2013 | Beaulieu |
| 2013/0156897 | A1* | 6/2013 | Goldstein .......... B65D 85/8043 426/115 |
| 2014/0072675 | A1 | 3/2014 | Norton |

FOREIGN PATENT DOCUMENTS

| | | |
|---|---|---|
| EP | 0179641 | 4/1986 |
| EP | 1101430 | 5/2001 |
| EP | 1101430 A1 | 5/2001 |
| EP | 1440913 | 7/2004 |
| EP | 1440913 A1 | 7/2004 |
| EP | 2287090 | 2/2011 |
| EP | 2287090 A1 | 2/2011 |
| JP | 2004508077 | 3/2004 |
| JP | 3742344 | 2/2006 |
| JP | 2007504889 | 3/2007 |
| KR | 20020075438 | 10/2002 |
| KR | 20030093418 | 12/2003 |
| KR | 20060121863 | 11/2006 |
| WO | 200160712 | 8/2001 |
| WO | 2006005736 | 1/2006 |
| WO | 2006111807 | 10/2006 |
| WO | WO 2006111807 A1 * | 10/2006 .......... B65D 85/8043 |
| WO | 2007122144 | 11/2007 |
| WO | WO2010138563 A1 | 2/2010 |
| WO | WO2010085824 A1 | 5/2010 |
| WO | 2010085824 | 8/2010 |
| WO | 2010138563 | 12/2010 |
| WO | 2011031294 | 3/2011 |
| WO | 2013043048 | 3/2013 |
| WO | 2014043106 | 3/2014 |

OTHER PUBLICATIONS

International Search Report, dated Jan. 10, 2014 for PCT/US2013/58999 (4 pgs.).
Written Opinion of the International Searching Authority for PCT/US2013/58999 (7 pgs.).
Australian Patent Office, Office Action dated Sep. 15, 2015, from corresponding Australian Application 2013315753, 4 pages.
Korean Patent Office, Office Action dated May 18, 2016, from corresponding Korean Patent Application No. 10-2015-7006080, 16 pages.
European Patent Office, Office Action dated May 3, 2016, from corresponding European Patent Application No. 13773898.5, 6 pages.
Russian Patent Office, Office Action dated Apr. 7, 2016, from corresponding Russian Patent Application No. 2015108154, 7 pages.
European Patent Office, Office Action dated Dec. 19, 2016 from corresponding European Patent Application No. 13773898.5, 6 pages.
Korean Patent Office, Office Action dated Nov. 23, 2016 from corresponding Korean Patent Application No. 10-2015-7006080, 5 pages.
Chinese Patent Office, Office Action dated Sep. 23, 2016, from corresponding Chinese Patent Application No. 201380047323.X, 8 pages.
Chinese Patent Office, Office Action dated Apr. 6, 2017, from corresponding Chinese Patent Application 201380047323.X, 9 pages.
Taiwanese Patent Office, Office Action dated Mar. 9, 2017, from corresponding Taiwanese Patent Application No. 102132947, 13 pages.
Korean Patent Office, Office Action dated Mar. 9, 2017 from corresponding Korean Patent Application No. 10-2015-7006080, 7 pages.
Canadian Patent Office, Office Action dated Dec. 14, 2016, from corresponding Canadian Patent Application No. 2879183, 6 pages.
Chinese Patent Office, Office Action dated Feb. 21, 2019, from corresponding Chinese Patent Application 201380047323.X, 10 pages.
Indian Patent Office, Office Action dated Mar. 19, 2019, from corresponding Indian Patent Application No. 1346/CHENP/2015, 5 pages.
Korean Patent Office, Office Action dated Nov. 7, 2018 from corresponding Korean Patent Application No. 10-2017-7015689, 21 pages.
Chinese Patent Office, Office Action dated Jan. 10, 2018 from corresponding Chinese Patent Application No. 201380047323.X, 8 pages.

* cited by examiner

CARTRIDGES, SYSTEMS AND METHODS FOR PREPARATION OF BEVERAGES

FIELD

The present application relates to cartridges, systems and methods for preparation of beverages.

BACKGROUND

Cartridges for use in the preparation of beverages are well known. For example, it is known to provide a cartridge for use in a beverage preparation machine which, in use, is pierced by a piercing element of the beverage preparation machine to allow hot water to flow through the cartridge to brew a beverage medium such as roasted ground coffee.

US2010/0303964 describes one such cartridge including a container, a beverage medium, a filter and a filter guard. The filter guard is arranged to be contacted by a piercing member and thereby be displaced upwardly during use. Displacement of the filter guard during use causes distortion of the filter and the beverage medium that may lead to inconsistent brewing of the beverage medium. Disruption to the beverage medium can lead to the formation of crevices in the beverage medium during brewing which allows the hot water to preferentially flow through the crevices rather than a uniform bed of the beverage medium. In addition, the need for the piercing element of the beverage preparation machine to displace the filter guard increases the force required to close a brew chamber of the beverage preparation machine and may also lead over time to blunting of the piercing element.

SUMMARY

The present disclosure provides a cartridge for preparation of a beverage comprising:
a closed container defining a container volume;
a filter located in the closed container to divide the container volume into an ingredient chamber volume and a filtrate volume;
a beverage medium located in the ingredient chamber volume; and
a guard element located in the filtrate volume;
wherein the guard element is separately-formed from the closed container and located within the filtrate volume to define an outlet zone, the guard element being interposed between the filter and the outlet zone;
wherein the guard element is configured to prevent encroachment of the filter into the outlet zone such that in use on full extension of a piercing element of a beverage preparation apparatus the piercing element is enabled to be placed in fluid communication with the outlet zone without the piercing element contacting the guard element or filter.

In one embodiment the guard element may be configured to provide physical support to at least a portion of the filter in use.

In one embodiment, the guard element acts as a filter guard to help prevent the filter being damaged during the piercing of the cartridge. In addition, the physical support of the filter coupled with the non-contact of the piercing element with the guard element or filter helps to prevent disturbance of the beverage medium during brewing or blunting of the piercer element.

The guard element may be configured to provide a clearance distance between the piercing surface and the filter, which is greater than a penetration distance of said piercing element into the closed container.

The guard element may comprise a filter support surface and at least one strut portion for spacing the filter support surface from the piercing surface of the cartridge.

In one aspect the strut portion may comprise a circumferential side wall. The circumferential side wall may comprise a plurality of elongate support ribs interposed by elongate filtrate apertures. In one aspect the circumferential side wall may be inwardly-tapered such that a diameter of the filter support surface is less than a diameter of a distal end of the circumferential side wall. In this aspect the guard element and/or outlet zone may be frustoconical in shape.

The filter support surface may comprise a plurality of elongate support ribs interposed by elongate filtrate apertures.

In one aspect the closed container may comprise a cup-shaped body and a lid, the cup-shaped body comprising a base defining the piercing surface and a side wall extending from the base to the lid, wherein the guard element comprises a filter support surface and at least one strut portion for spacing the filter support surface from the piercing surface of the cartridge, wherein a distal end of said strut portion is abutted into an angle formed between the side wall and the base. In this manner the guard element may be reliably located relative to the rest of the closed container. The guard element may also assist in increasing the structural strength of the cartridge as the guard element may form a load-bearing member, in particular for radial loads.

The side wall in the region of the base may be inwardly-tapered so as to retain the distal end of the strut portion. Use of an inward-taper is efficient in that no separate fixture is required to locate the guard element and the guard element may be easily assembled with the cup-shaped body in an automated process.

In another aspect the guard element may be configured to define an annular outlet zone. The guard element may comprise inner and outer circumferential side walls depending from a filter support surface of the guard element. The inner and/or outer circumferential side wall may comprise a plurality of wall sections interposed by filtrate apertures. The guard element may comprise a lower flange element defining a lower rim of the guard element. As in the above aspects the guard element may be insertable into a capsule having a cup-shaped body and a lid, wherein a the lower rim of the lower flange element is abutted into an angle formed between the side wall and the base. In this manner the guard element may be reliably located relative to the rest of the closed container. The guard element may also assist in increasing the structural strength of the cartridge as the guard element may form a load-bearing member, in particular for radial loads.

The side wall in the region of the base may be inwardly-tapered so as to retain the lower flange element. Use of an inward-taper is efficient in that no separate fixture is required to locate the guard element and the guard element may be easily assembled with the cup-shaped body in an automated process.

The side wall of the cartridge may be provided with a plurality of flutes defining a plurality of channels for directing filtrate downwardly towards the base of the cartridge.

The guard element may be rigid.

The guard element may be a one-piece moulding.

The cup-shaped body and/or guard element may be formed from polypropylene, polyester, polystyrene, nylon, polyurethane, acetal, acetal grade polyoxylene methylene copolymer (e.g. Centrodal C), other engineering plastics, composites, ceramics, or biodegradable plastics such as degradable polyethylene (for example, SPITEK supplied by Symphony Environmental, Borehamwood, United Kingdom), biodegradable polyester amide (for example, BAK 1095 supplied by Symphony Environmental), or poly lactic acids (PLA) (supplied by Cargill, Minn., USA). The cup-shaped body and/or guard element may comprise a laminate of materials. The laminate may comprise a layer providing a barrier to moisture and or gas transmission. An example is EVOH. The laminate may comprise one or more adhesive layers.

The guard element may be a stackable component. It may be provided with a feature to enable easy separation of individual guard elements from a stack of guard elements. In one aspect the feature comprises a spacing projection that defines a minimum clearance between stacked guard elements. The spacing projection may be located on or near a central axis of the guard element.

The filter may comprise a side wall and a base. The filter may be cup-shaped. The filter may be formed from one piece or one moulding. Suitable materials for the filter include woven and non-woven materials, paper, and cellulose as well as plastics such as polypropylene and polyethylene. The paper or cellulose material may contain fibres of another material, for example, polypropylene or polyethylene.

The lid may be formed from polyethylene, polypropylene, polyesters including polyethylene terephthalate, polyvinyl chloride, polyvinylidene chloride, polyamides including nylon, polyurethane, paper, viscose and/or a metal foil. The lid may comprise a laminate, be metallised or formed of copolymers. In one example, the lid comprises a polypropylene-aluminium laminate.

The disclosure finds particular application where the beverage medium is an extractable/infusible product such as roasted ground coffee or leaf tea. However, the beverage medium may alternatively be a water-soluble ingredient such as instant spray-dried or freeze-dried coffee, a chocolate powder, a milk powder or a creamer powder. Milk powders may include dried skimmed milk, part-skimmed milk, and whole milk, dried milk protein concentrates, isolates, and fractions, or any combination thereof. Creamer powders may be manufactured from dairy and/or non-dairy food ingredients and typically contain emulsified fat, stabilized by protein or modified starch, dispersed in a carrier that facilitates drying, especially spray drying. The powdered product may be agglomerated. As a further alternative the beverage medium may be a mixture of extractable/infusible ingredients and water-soluble ingredients, for example a mixture of roasted ground coffee and instant freeze-dried coffee.

In one aspect the closed container may comprise a cup-shaped body and a lid, the cup-shaped body comprising a base defining the piercing surface and a container side wall extending from the base to the lid, wherein the filter comprises an upper rim that is connected at or near a lid-end of the container side wall and/or between the container side wall and the lid and further comprises a filter side wall that is unconnected to the container side wall. The filter may comprise a base portion and the guard element may provide physical support to substantially the whole base portion of the filter.

In a particular aspect there is provided a cartridge for preparation of a beverage comprising:

a closed container comprising a cup-shaped body and a lid, the cup-shaped body comprising a base defining a piercing surface and a container side wall extending from the base to the lid, the closed container defining a container volume;

a filter located in the closed container to divide the container volume into an ingredient chamber volume and a filtrate volume;

a beverage medium located in the ingredient chamber volume; and a guard element located in the filtrate volume comprising a filter support surface and a circumferential side wall for spacing the filter support surface from the piercing surface of the cartridge;

wherein a distal end of said circumferential side wall is abutted into an angle formed between the container side wall and the base;

wherein the guard element is separately-formed from the closed container and located within the filtrate volume to define an outlet zone, the guard element being interposed between the filter and the outlet zone;

wherein the guard element is configured to provide physical support to at least a portion of the filter in use and to prevent encroachment of the filter into the outlet zone such that on piercing of the piercing surface by a piercing element of a beverage preparation apparatus the piercing element is enabled to be placed in fluid communication with the outlet zone without the piercing element contacting the guard element or filter.

The present disclosure also provides a beverage preparation system comprising a beverage preparation apparatus and a cartridge as described in any of the aspects noted above, the beverage preparation apparatus comprising an outlet piercing element adapted to pierce a piercing surface of said cartridge to enable fluid communication between the outlet zone of said cartridge and an outlet of said beverage preparation apparatus without the piercing element contacting the guard element or filter of said cartridge.

The beverage preparation apparatus may be configured such that the outlet piercing element is off-set from a central axis of the piercing surface. This may be advantageous where the guard element comprises a centrally located spacing projection so as to avoid contact between the spacing projection and the outlet piercing element. Likewise, this may be advantageous where the outlet zone is annularly configured.

The present disclosure further provides a method for preparing a beverage comprising:

providing a closed container containing a beverage medium located in a ingredient chamber volume; said ingredient chamber volume being separated from a filtrate volume by a filter; said filtrate volume containing a separately-formed guard element;

piercing an inlet in an inlet piercing surface of the container using an inlet piercing element;

piercing an outlet in an outlet piercing surface of the container using an outlet piercing element;

supplying fluid through the inlet into the ingredient chamber volume to form a beverage from the beverage medium;

passing the beverage through the filter into the filtrate volume;

supporting the filter using the guard element to prevent encroachment of the filter into an outlet zone located between the guard element and the outlet piercing surface; and discharging the beverage from the filtrate volume via the outlet zone and outlet.

BRIEF DESCRIPTION OF THE DRAWINGS

Aspects of the present disclosure will now be described, by way of example only, with reference to the accompanying drawings, in which.

DETAILED DESCRIPTION

Figure 1:
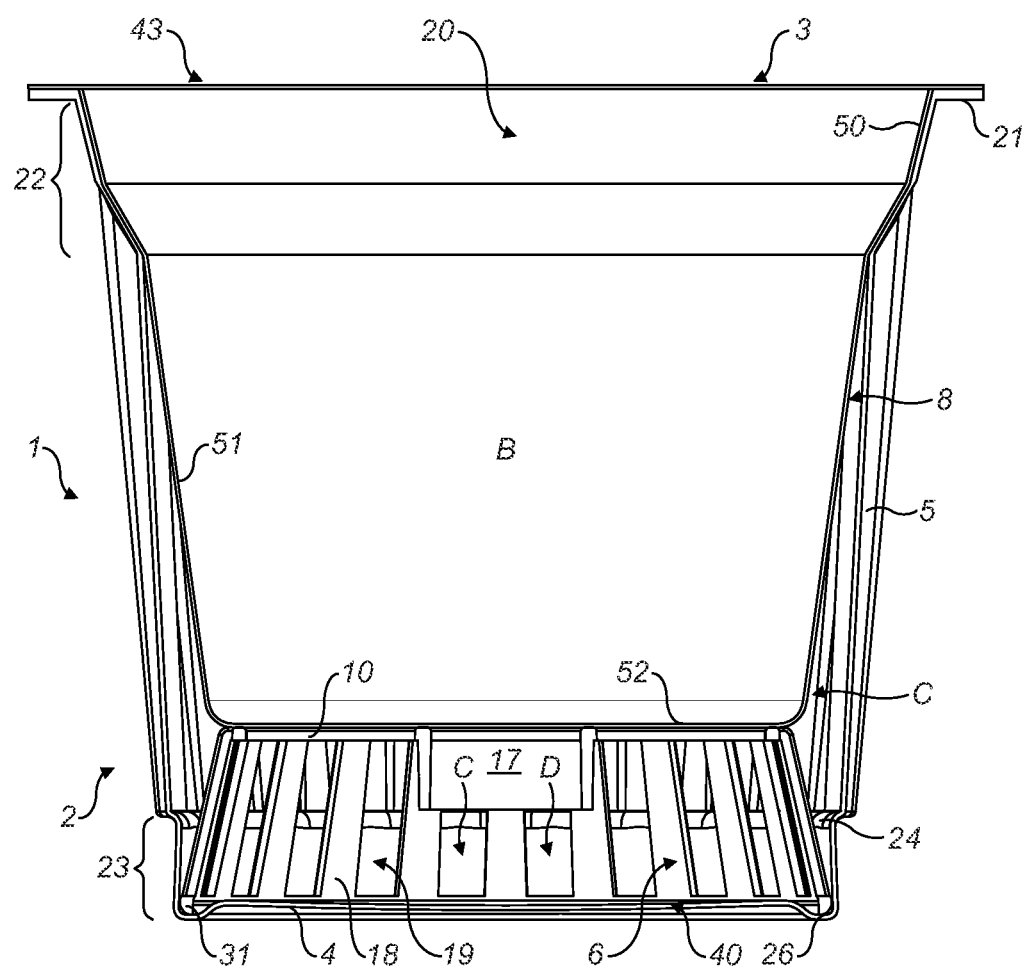
FIG. 1 is a cross-sectional elevation of a cartridge according to one embodiment of the present disclosure.

As shown in FIG. 1, in a first aspect the cartridge 1 comprises a cup-shaped body 2, a lid 3, a filter guard 6 and a filter 8.

Figure 2:
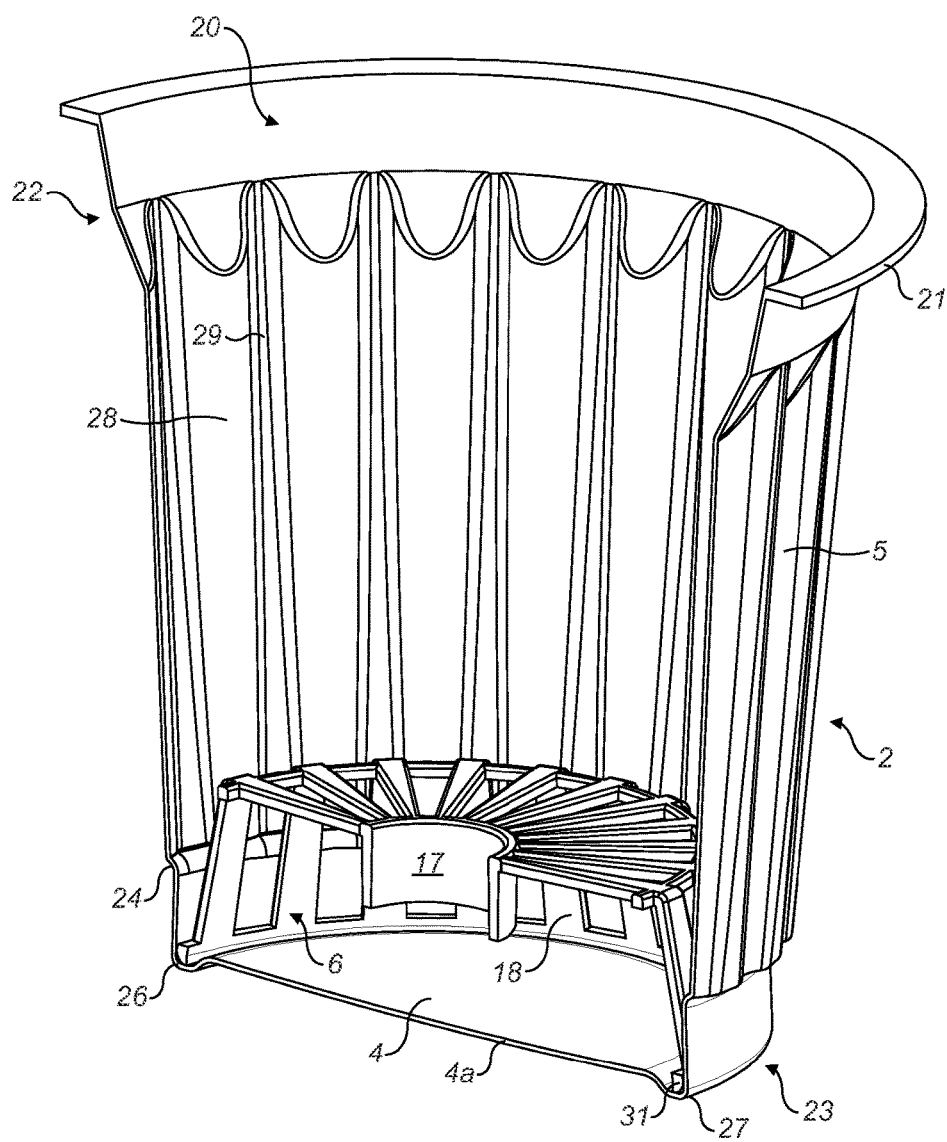
FIG. 2 is a perspective cross-sectional view of the cartridge of FIG. 1.

The cup-shaped body 2 of FIG. 1 comprises a circular base 4 and an upwardly extending sidewall 5 that terminates at an upper rim 21 which defines an open upper end 20 of the cup-shaped body 2. As shown in FIG. 2, the side wall 5 is provided on its inner face with a plurality of flutes 28 that project radially inwards so as to define channels 29 interposed between the flutes 28 which run down a substantial length of the side wall 5 from the open upper end 20 towards the base 4. The side wall 5 is generally frustoconical in shape with a diameter at the open upper end 20 being larger than a diameter at the side wall 5 adjacent to the base 4. An upper region of the side wall 5 adjacent to the upper rim 21 has an inwardly tapering section 22 extending downwardly from the upper rim 21. In addition, the side wall 5 in the region of the base 4 is provided with an outwardly tapering section 23. An upper end of the outwardly tapering region 23 connects to the remainder of the side wall 5 at an out-turned shoulder 24.

Figure 4:
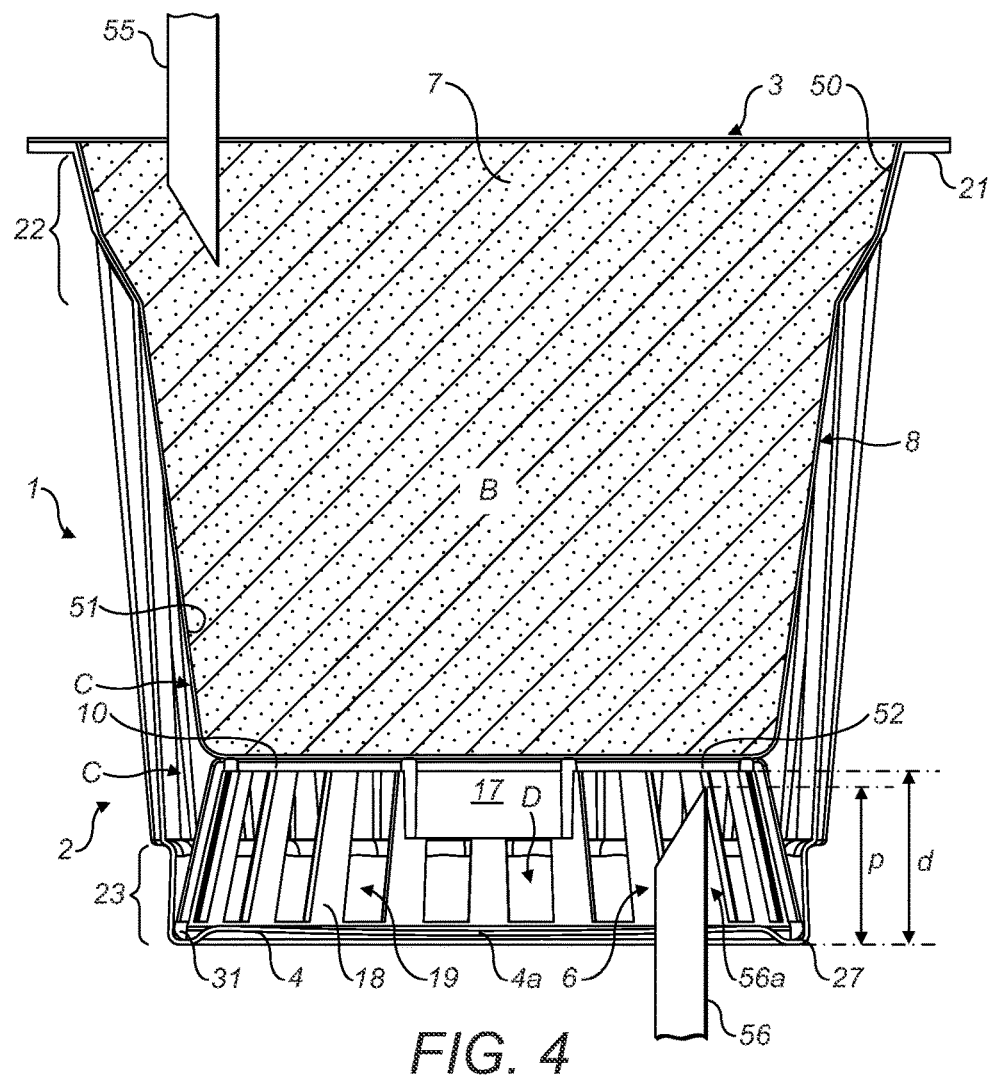
FIG. 4 is a cross-sectional elevation of the cartridge of FIG. 1 during dispensation.

The base 4, illustrated for example in FIG. 4, is generally flat and includes an annular recess 26 which is provided at its outer periphery at an angle 27 between the base 4 and the side wall 5. A flat portion 4a of the base 4 provides a lower piercing surface 40 of the cartridge 1.

A plurality of cup-shaped bodies 2 may be stacked together prior to assembly of the cartridges 1.

The lid 3 comprises a disc that is bonded or otherwise sealed to the upper rim 21 of the cup-shaped body 2 to close the open upper end 20 of the cartridge 1. The lid 3 defines an upper piercing surface 43 of the cartridge 1.

In one embodiment, the filter 8 has a generally cup-shaped form having an upper filter rim 50 which is bonded or otherwise sealed to the cup-shaped body 2 either at or near the upper rim 21. In a non-illustrated example the filter rim 50 is bonded between the upper rim 21 of the cup-shaped body 2 and the lid 3. A filter side wall 51 may extend downwardly from the filter rim 50 and may be closed off at a lower end by a filter base 52 as illustrated. The filter 8 may be formed from a single piece or moulding of filter material.

Figure 3:
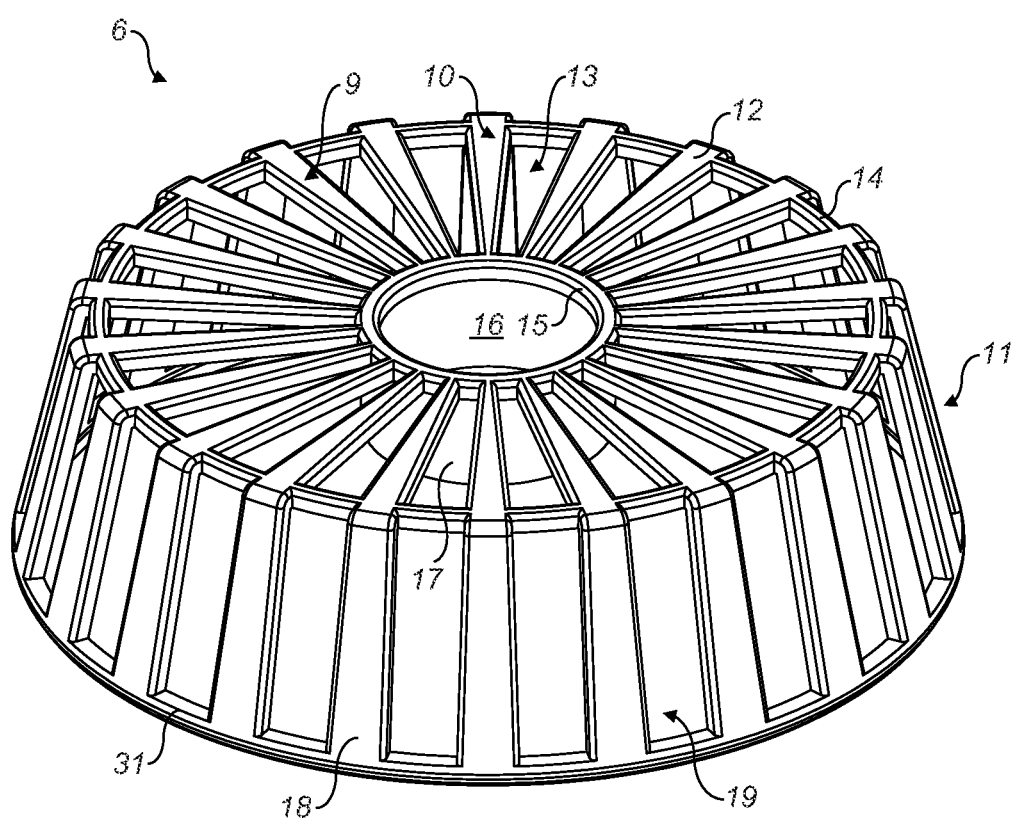
FIG. 3 is a perspective view of a filter guard of the cartridge of FIG. 1.

The filter guard 6 may be formed as a separate component from the cup-shaped body 2 and filter 8 and may be located at a lower end of the cup-shaped body 2 as shown in FIGS. 1 and 2. As most clearly shown in the embodiment of FIG. 3, the filter guard 6 comprises an upper portion 9 defining an upper surface 10 and a circumferential wall 11 which, in the illustrated embodiment, extends downwardly and outwardly from the upper portion 9 to terminate at a lower rim 31. The upper portion 9 comprises an outer circumferential rim 14 and an inner circumferential rim 15 which are joined together by a plurality of radial bars 12 which define interposed upper apertures 13. The inner rim 15 defines a central aperture 16 which extends downwardly through a downwardly extending tube 17. The circumferential wall 11 may include a plurality of axially-orientated (or substantially axially-orientated) bars 18 which extend from the lower rim 31 to the outer rim 14 and which define interposed side apertures 19. The filter guard 6, illustrated in FIG. 3, is generally frustoconical in shape with a diameter of the lower rim 31 being greater than the diameter of the outer rim 14.

The filter guard 6 may be rigid; meaning that it has sufficient structural strength so as not to undergo any substantial deformation during the use described below.

Advantageously, the filter guard 6 is shaped so as to be a stackable component prior to assembly of the cartridge 1. The downwardly extending tube 17 serves to ensure that adjacent filter guards 6 are spaced slightly from one another when stacked to ensure ease of separation of each filter guard 6 from the stack.

As most clearly shown in FIG. 2, the lower rim 31 of the filter guard 6 may be located in the annular recess 26 of the cup-shaped body 2 with the lower rim 31 held in contact with the angle 27 between the side wall 5 and the base 4.

In an exemplary assembly technique for the cartridge 1 as shown in FIG. 1, the filter guard 6 is first inserted into the open topped cup-shaped body 2 and pushed downwardly so as to engage the lower rim 31 as a push fit into contact with the angle 27 and recess 26. Insertion of the filter guard 6 in one embodiment, is accommodated by flexure of the side wall 5 to allow the relatively rigid lower rim 31 to pass the smaller diameter of the cup-shaped body 2 at the level of the out-turned shoulder 24. The side wall 5 is resilient in nature such that once inserted past the out-turned shoulder 24 the filter guard 6 is gripped and retained by the side wall 5 in contact with the angle 27 between the base 4 and the side wall 5 without the requirement for any additional bonding or connection means.

Next, the filter 8 is inserted into the cup-shaped body 2 through the open upper end 20 and bonded or otherwise connected to or near the upper rim 21, for example by heat sealing.

As shown in FIG. 1, with the filter 8 in place a container volume of the cartridge 1 is divided into a beverage ingredient volume B to one side of the filter 8 and a filtrate volume C to the other side of the filter 8. The filter guard 6 is located in the filtrate volume C beneath the filter 8. The channels 29 formed between the flutes 28 form part of the filtrate volume C as they are 'downstream' of the filter 8.

A portion of beverage ingredients 7, such as roasted ground coffee, is filled through the open upper end 20 into the beverage ingredient volume B. The cartridge 1 is then closed by sealing the lid 3 to the upper rim 21 with or without sandwiching of the filter rim 50 therebetween. Two or more of the assembly steps described above may be combined into a single assembly process step.

In FIG. 1, when assembled the filter base 52 is physically supported by the upper surface 10 of the filter guard 6. In one embodiment, the upper surface 10 of the filter guard 6 is configured to ensure that the material of the filter 8 does not extend into a portion of the filtrate volume C which can be considered an outlet zone D of the cartridge 1. The outlet zone D is defined as the volume between the filter guard 6 and the base 4 of the cup-shaped body 2. In one embodiment, filter guard 6 is configured to receive the piercing element such that, when the piercing element is fully extended in use, the piercing element does not move filter guard 6. In one embodiment, filter guard 6 is configured to receive the piercing element such that, when the piercing element is fully extended in use, the piercing element does not contact filter guard 6. In one embodiment, filter guard 6 defines an aperture 56*a* that may be configured to receive a piercing element of a beverage preparation apparatus, such that, when the piercing element is fully extended into outlet zone D in use the piercing element is placed in fluid communication with the outlet zone D.

In use, as shown in FIG. 4, the cartridge 1 is inserted into a beverage preparation apparatus of known type in which an inlet piercing element 55 and outlet piercing element 56 are engaged with the cartridge 1 to permit brewing and dispensation. As shown, the inlet piercing element 55 pierces the upper piercing surface 43 of the cartridge 1 to form an inlet so as to provide fluid communication to the beverage ingredient volume B. The outlet piercing element 56 pierces the lower piercing surface 40 of the base 4 to form an outlet to provide an exit flow path for beverage formed from the beverage ingredient 7 to leave the cartridge 1 and thereafter the beverage preparation apparatus can be dispensed to a receptacle such as a cup. The outlet piercing element 56 may be offset from the centre of the cartridge 1 so as not to be impeded by the downwardly-extending tube 17.

Aqueous medium, such as hot water, is injected into the cartridge 1 through the inlet piercing element 55 to contact the beverage medium 7. A beverage extract is thus formed which passes through the filter 8 into the filtrate volume C. The beverage extract passes through the filter side wall 51 into the channels 29 where it is able to run downwardly and into the outlet zone D via the side apertures 13 in the filter guard 6. Extract also passes through the filter 8 through the filter base 52 and into the outlet zone D through the upper apertures 13 and central aperture 16 of the filter guard 6.

Advantageously, as shown in FIG. 4, a distance d between the base 4 of the cup-shaped body 2 and the lower face of the radial bars 12 of the filter guard 6 is greater than a penetration distance p of the outlet piercing element 56 into the cartridge 1. This ensures that during use the outlet piercing element 56 does not contact either the filter guard 6 or the filter 8. In one embodiment, aperture 56*a* of filter guard 6 extends from base 4 toward upper surface 10 a distance that is greater than penetration distance p. As shown in FIGS. 1 and 4, the upper surface 10 of the filter guard 6 contacts the filter base 52 and provides a uniform clearance distance between the filter base 52 and the piercing surface 40 of the base 4.

Figure 5:
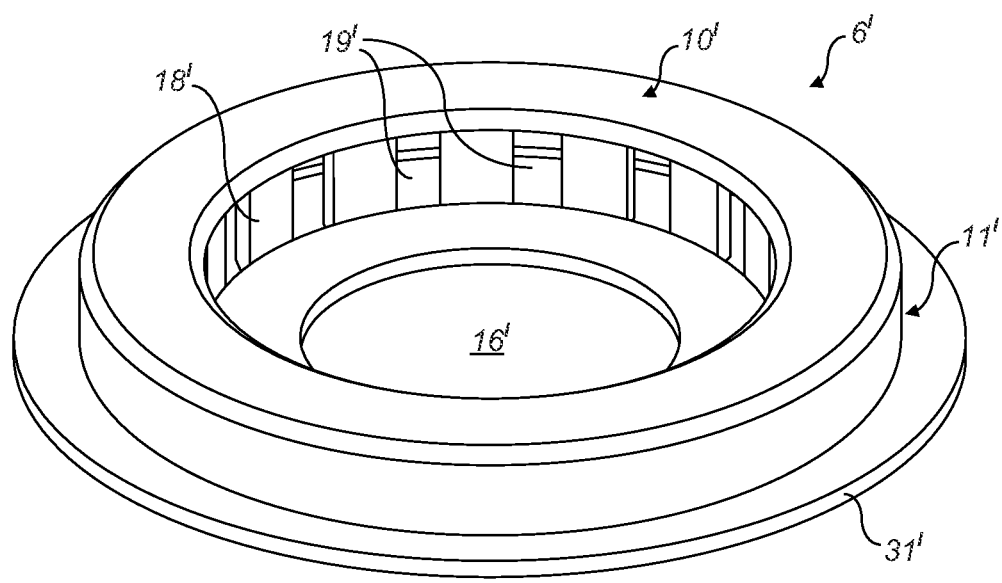
FIG. 5 a perspective view of another embodiment of a filter guard of the present disclosure.

FIG. 5 shows another aspect of filter guard 6' that may be incorporated into the capsule 1 in place of the filter guard 6 of FIG. 3. In describing this aspect, features common to the previous aspect, in particular the configuration of the cup-shaped body 2, lid 3 and filter 8 will not be described further and reference should be made to the passages above.

Figure 6:
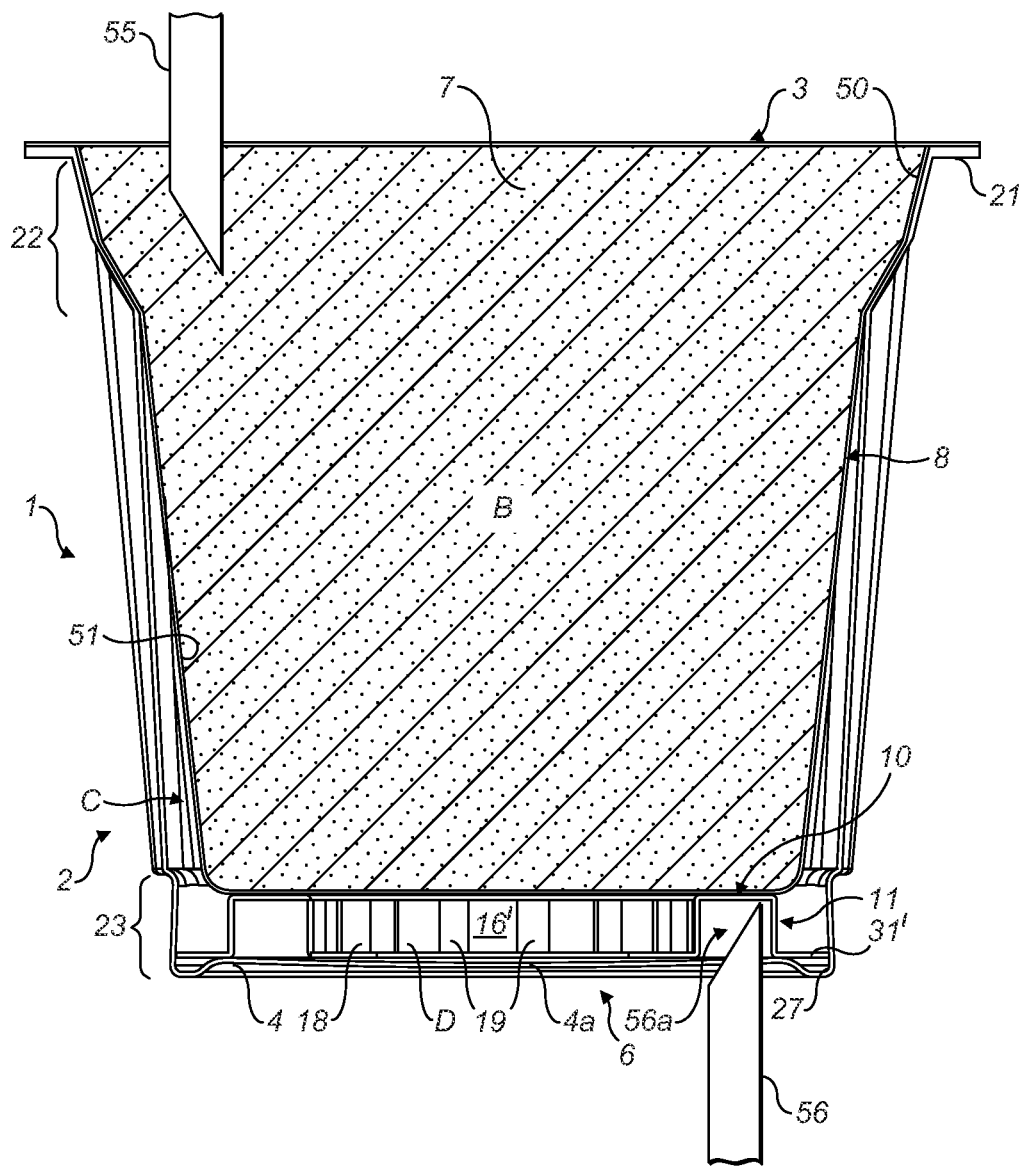
FIG. 6 is a cross-sectional elevation of a cartridge containing the filter guard of FIG. 5 during dispensation.

As before, the filter guard 6' may be formed as a separate component from cup-shaped body 2 and is located at a lower end of the cup-shaped body 2 as shown in FIG. 6. The filter guard 6' comprises an annular portion defining an upper surface 10', an outer circumferential wall 11' and an inner circumferential wall, both walls extending downwardly from the upper portion to adjoin a lower flange element. The lower flange element defines a lower rim 31'. A central aperture 16' is provided within the upper surface 10'. The inner circumferential wall comprises a plurality of wall sections 18' which define interposed side apertures 19'.

The filter guard 6' may be rigid meaning that it has sufficient structural strength so as not to undergo any substantial deformation during the use described below.

Assembly of the cartridge 1 is as described previously except that the filter guard 6' is inserted such that the lower rim 31' is engaged in or close to the angle 27 of the cup-shaped body 2. As above, the inwardly-tapered section 23 serves to maintain the filter guard 6' in the correct position.

As can be seen from FIG. 6, when assembled the filter base 52 is physically supported by the upper surface 10' of the filter guard 6' which ensures that the material of the filter 8 does not extend into a portion of the filtrate volume C which can be considered an outlet zone D of the cartridge 1. The outlet zone D is defined as the enclosed volume between the filter guard 6' and the base 4 of the cup-shaped body 2.

Use of the cartridge 1 is as described above except that beverage extract passing through the filter 8 is channelled to the outlet piercer 56 via the side apertures 19' and the annular outlet zone D.

In a modification of the above aspect, the outer circumferential wall 11' may also be provided with apertures 19' for passage of beverage flow into the outlet zone D.

From the foregoing it will be appreciated that cartridges for preparation of beverages and components for such cartridges are provided.

The invention claimed is:

1. A cartridge for preparation of a beverage comprising:
   a closed container defining a container volume and including a body, the body having a closed lower end portion with a piercing surface and an upper end portion opposite the closed lower end portion, the body including an annular side wall;
   a filter located in the closed container to divide the container volume into an ingredient chamber volume and a filtrate volume, wherein the filter is connected to and extends downward from the upper end portion of the body;
   a base of the filter and a side wall of the filter extending upward from the base toward the upper end portion of the body;
   a beverage medium located in the ingredient chamber volume; and
   a guard element located in the filtrate volume;
   wherein the guard element is separately-formed from the closed container and located within the filtrate volume to define an outlet zone, the guard element being interposed between the filter and the outlet zone;
   a filter support surface of the guard element;
   an inwardly-tapered circumferential side wall of the guard element spacing the filter support surface from the piercing surface of the body closed lower end portion and radially inward from the side wall of the body, the circumferential side wall including a plurality of struts and apertures between the struts that permit beverage to flow therethrough,
   wherein the guard element is configured to prevent encroachment of the filter into the outlet zone such that in use on full extension of a piercing element of a beverage preparation apparatus the piercing element is enabled to be placed in fluid communication with the outlet zone without the piercing element contacting either the guard element or filter;
   the filter support surface of the guard element contacts the base of the filter and provides a uniform clearance distance between the base of the filter and the piercing surface of the body.

2. A cartridge as claimed in claim 1 wherein the guard element is configured to provide physical support to at least a portion of the filter in use.

3. A cartridge as claimed in claim 1 wherein the clearance distance between the piercing surface and the filter is greater than a penetration distance of said piercing element into the closed container.

4. A cartridge as claimed in claim 1 wherein the guard element comprises a lower annular rim supported by the body lower end portion.

5. A cartridge as claimed in claim 1 wherein the the filter support surface has a diameter that is less than a diameter of a distal end of the circumferential side wall.

6. A cartridge as claimed in claim 1 wherein the filter support surface comprises a plurality of elongate support ribs interposed by elongate filtrate apertures.

7. A cartridge as claimed in claim 1 wherein the closed container comprises a lid, the body is cup-shaped, the closed lower end portion of the body including a base defining the piercing surface, the body a side wall extending from the base to the lid, wherein a distal end of each of the struts is abutted into a corner between the side wall and the base.

8. A cartridge as claimed in claim 7 wherein the side wall in the region of the base is inwardly-tapered so as to retain the distal ends of the struts.

9. A cartridge as claimed in claim 1 wherein the closed container comprises a lid, the body is cup-shaped, the closed lower end portion of the body including a base defining the piercing surface, the body side wall extending from the base to the lid, wherein the filter comprises an upper rim that is connected to the body at a lid-end portion of the side wall or between the side wall and the lid, and the filter side wall is unconnected to the side wall.

10. A cartridge as claimed in claim 9 wherein the guard element provides physical support to substantially the whole base of the filter.

11. A cartridge as claimed in claim 1 wherein the guard element is rigid.

12. A cartridge as claimed in claim 1 wherein the guard element is a one-piece moulding.

13. A cartridge as claimed in claim 1 wherein the upper end portion of the body includes a rim extending about an opening and the side wall extends downwardly from the rim.

14. A cartridge as claimed in claim 13 wherein the filter includes an upper rim connected to the side wall of the body.

15. A cartridge for preparation of a beverage comprising:
a closed container comprising a cup-shaped body and a lid, the cup-shaped body comprising a body base defining a piercing surface and an annular container side wall extending from the body base to the lid, the closed container defining a container volume;
a filter located in the closed container to divide the container volume into an ingredient chamber volume and a filtrate volume, the filter having a filter base and a sidewall extending from the filter base toward the lid;
a beverage medium located in the ingredient chamber volume; and
a guard element located in the filtrate volume comprising a filter support surface that contacts the filter base and provides a uniform clearance distance between the filter base and the piercing surface of the body, the guard element further comprising an inwardly-tapered circumferential side wall for spacing the filter support surface from the piercing surface of the cartridge and radially inward from the container side wall, the circumferential side wall including a plurality of struts and apertures between the struts that permit beverage to flow therethrough;
wherein a distal end of said circumferential side wall is abutted into a corner between the container side wall and the body base;
wherein the guard element is separately-formed from the closed container and located within the filtrate volume to define an outlet zone, the guard element being interposed between the filter and the outlet zone;
wherein the guard element is configured to provide physical support to at least a portion of the filter in use and to prevent encroachment of the filter into the outlet zone such that on piercing of the piercing surface by a piercing element of a beverage preparation apparatus the piercing element is enabled to be placed in fluid communication with the outlet zone without the piercing element contacting either the guard element or filter.

16. A cartridge as claimed in claim 15 wherein the guard element includes a tube depending from the filter support surface.

* * * * *